(12) United States Patent
Abe et al.

(10) Patent No.: US 11,412,724 B2
(45) Date of Patent: Aug. 16, 2022

(54) FISHING REEL COMPONENTS AND METHOD OF MANUFACTURING THE SAME

(71) Applicant: GLOBERIDE, Inc., Tokyo (JP)

(72) Inventors: Yutaro Abe, Tokyo (JP); Mamoru Koike, Tokyo (JP); Takeshige Ohara, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 17/183,419

(22) Filed: Feb. 24, 2021

(65) Prior Publication Data

US 2021/0274764 A1  Sep. 9, 2021

(30) Foreign Application Priority Data

Mar. 3, 2020 (JP) .............................. JP2020-035884

(51) Int. Cl.
*A01K 89/01* (2006.01)
*A01K 89/015* (2006.01)

(52) U.S. Cl.
CPC .. *A01K 89/01929* (2015.05); *A01K 89/01931* (2015.05)

(58) Field of Classification Search
CPC ........ A01K 89/01929; A01K 89/01931; A01K 89/0192; A01K 89/0193; A01K 89/01121;
(Continued)

(56) References Cited

U.S. PATENT DOCUMENTS 6,533,202 B1\* 3/2003 Koike .................... A01K 89/01
242/310
8,985,493 B2\* 3/2015 Niitsuma ........... A01K 89/0186
242/321
(Continued)

FOREIGN PATENT DOCUMENTS

CN 103081876 A 5/2013
CN 110024758 A 7/2019
(Continued)

OTHER PUBLICATIONS

Chinese Office Action and English translation for related Chinese Patent Application No. 202110217234.1; report dated May 7, 2022; (25 pages).

*Primary Examiner* — Emmanuel M Marcelo
(74) *Attorney, Agent, or Firm* — K&L Gates LLP

(57) ABSTRACT

Fishing reel components and a manufacturing method thereof that achieve not only highly accurate finishing dimensions, but also a deep and glossy metallic appearance while maintaining sufficient corrosion resistance at a precision finishing portion that rotatably supports a drive member, and that can increase the work efficiently of the entire surface treatment. The fishing reel components include a body member having a coating layer formed of higher-purity aluminum than that of the die-cast material on the die-cast material; and the anticorrosion layer formed by anodization on the coating layer. The body member is provided with the support portion that rotatably supports a drive member. The support portion independent from the body member is formed by the support member having a higher corrosion resistance than the die-cast material of the body member.

7 Claims, 12 Drawing Sheets

(58) Field of Classification Search
CPC ..... A01K 89/011223; C23C 2/12; C23C 2/26;
C23C 2/28; C23C 24/08; C23C 24/087;
C23C 28/30; C23C 28/322; C23C 28/345
See application file for complete search history.

(56) References Cited

U.S. PATENT DOCUMENTS

2013/0112795 A1    5/2013    Niitsuma et al.
2019/0216070 A1*  7/2019    Koike ........................ C23C 2/12

FOREIGN PATENT DOCUMENTS

| JP | 2008081839 A | * | 4/2008 |
| JP | 2019-122273 A | | 7/2019 |
| KR | 20040019887 A | * | 8/2003 |

* cited by examiner

FISHING REEL COMPONENTS AND METHOD OF MANUFACTURING THE SAME

TECHNICAL FIELD

This disclosure relates to components of various types of fish fishing reels such as spinning reels, and a method of manufacturing the same.

BACKGROUND

Die-cast moldings are generally used as fishing reel components as they are highly versatile materials that allow mass production of products in relatively complex shapes at low cost. Such die-cast moldings are molded into desired shapes by a die casting method in which a die-cast material such as an aluminum alloy is melted, poured into a mold, and cast under high pressure, and is subjected to an exterior coating to obtain a desired decorative appearance following a predetermined pretreatment.

In addition, fishing reel components need to have certain qualities for outer surface (corrosion resistance, surface hardness, temperature change resistance or the like) such that they exhibit an excellent corrosion resistance since fishing reel components are used outdoors where sea water, water, foreign matters and the like are liable to adhere thereto; they are not easily scratched since they are often dropped on the ground or hit against others; and they resist temperature changes and are not prone to degradation of outer surface in summer or the like when they are exposed to an environment in which there is a particularly large change in temperature, including when such components are stored in a cooler and then, placed in a car trunk after actual fishing.

Although it is known to form an anodized coating layer with a higher corrosion resistance and hardness than those of exterior coating on a material of die-cast aluminum alloy moldings to meet such required qualities for the outer surface, it is difficult to achieve a good appearance with high hardness and glossiness even if die-cast aluminum alloy materials that contain a large amount of additives are anodized (alumite treatment).

Therefore, a form of surface treatment is proposed in Japanese Patent Application Publication No. 2019-122273 that meets required qualities depending on relevant parts of the reel components in relation to corrosion resistance and glossy appearance: by improving corrosion resistance by applying a surface treatment for forming an anticorrosion layer on a die-cast aluminum alloy material through anodization to precision finishing portions such as bearings and screw holes for which a predetermined finishing dimensional accuracy is required; and by obtaining good glossy appearance as well as corrosion resistance by applying to the outer surface portion (exterior portion) that is exposed to the external environment a surface treatment for laminating a coating layer formed of higher-purity aluminum than that of the die-cast material and an anticorrosion layer formed by anodization on the die-cast aluminum alloy material in turn.

According to the form of the surface treatment proposed in Japanese Patent Application Publication No. 2019-122273, in the fishing reel components using die-cast moldings, it is possible to achieve a better appearance and higher finishing dimensional accuracy of precision finishing portions than before. However, a surface treatment layer applied to the precision finishing portions, that is, an anticorrosion layer formed by anodization directly on a die-cast material with a large amount of additives, provides an anodization coating with a thickness of only about several microns. The thinness is preferable in the application to precision finishing portions for which a dimensional accuracy is required since it is not affected by variations in thickness of the coating. However, when a support portion rotatably supporting a drive member is formed by precision finishing portions having an anodized coating with only this thickness, sufficient corrosion resistance may not be achieved under severe use conditions in a fishing spot environment where seawater, water, foreign matters and the like easily adhere thereto, which restricts the condition for use of, and usage environment for, fishing reels. Therefore, in the support portion that rotatably supports the drive member, improvement in corrosion resistance is still desired.

In Japanese Patent Application Publication No. 2019-122273 mentioned above, to provide the above-mentioned different forms of surface treatment at the precision finishing portion and the outer surface portion after forming a coating layer and an anticorrosion layer at the same time at each of the precision finishing portion and the outer surface portion for the purpose of standardizing the formation process of the anticorrosion layer for the precision finishing portion and the outer surface portion to improve the efficiency of the entire surface treatment process, it is necessary to perform precision finishing while removing the coating layer and the anticorrosion layer already formed by cutting or the like at the precision finishing portion after formation of the anticorrosion layer by anodization (primary alumite treatment), and thereafter to again anodize the precision finishing portion and the outer surface portion in their entireties (secondary alumite treatment). However, if the anodization (alumite treatment) is performed multiple times, the anodization coating may be damaged (e.g., decoloration and deterioration) at the time of pretreatment (primary alumite treatment), which causes difficulty in controlling the anodization conditions and increases the number of the surface treatment processes to increase the manufacturing cost and decrease the work efficiency.

It could, therefore, be helpful to provide fishing reel components and a manufacturing method thereof that can achieve not only highly accurate finishing dimensions, but also a deep and glossy metallic appearance while maintaining sufficient corrosion resistance at a precision finishing portion that rotatably supports a drive member, and can increase the work efficiently of the entire surface treatment.

SUMMARY

We thus provide:

Fishing reel components formed of a die-cast material having on the material: a coating layer formed of higher-purity aluminum than that of the die-cast material; a body member having an anticorrosion layer formed by anodization on said coating layer; and a support portion provided on the body member and rotatably supporting a drive member, wherein the support portion is formed of a support member independent from the body member and having a higher corrosion resistance than the die-cast material of the body member.

According to the above configuration, as disclosed in the above-mentioned Japanese Patent Application Publication No. 2019-122273, the drive member can be rotatably supported by the support portion with a anticorrosion layer provided on a die-cast material via a coating layer, that is, by the support portion having a higher corrosion resistance than the die-cast material and provided on an anticorrosion layer capable of maintaining a sufficient thickness due to the interposition of the coating layer, instead of rotatably supporting the drive member as a support portion that is part of the body member (precision finishing portion) with only a thin anticorrosion layer formed by anodization directly on a die-cast material with a large amount of additives so that the support portion can obtain sufficient corrosion resistance even under severe use conditions in a fishing spot environment where seawater, water, foreign matters or the like easily adhere thereto, which avoids causing restrictions on the conditions of, and environment for, the use of a fishing reel. Further, since the support portion is formed from a support member independent from the body member, it is possible to achieve highly accurate finishing dimensions at the support portion by providing a high dimensional accuracy to the support member.

In addition, according to the above-mentioned configuration, the anticorrosion property and the rust-proof property of the anticorrosion layer formed by anodization on the coating layer are enhanced by the action of the coating layer of high-purity aluminum, and a deep and glossy metallic appearance is obtained with the enhanced surface hardness. Further, in the above configuration, the die-cast material is made of an aluminum alloy (e.g., ADC1, ADC3, ADC10 and ADC12), the adhesion of the coating layer to the body member is increased by the bonding between the aluminum portions whereby the corrosion resistance of the anticorrosion layer is further improved.

Further, according to the above configuration, it is not necessary to perform anodization (alumite treatment) over multiple times and also, even if the support member is machined, damage (e.g., decoloration and deterioration) to the existing anodized coating (anticorrosion layer) can be avoided (the corrosion resistance is not lost) since anodized may be omitted as the support member has a corrosion resistance whereby quality improvement can be achieved. Further, less surface treatment can reduce the cost and also improve the work efficiency in the entire surface treatment process.

As described above, our components, not only can the corrosion resistance basically required for fishing reel components be obtained, but also "dimensional accuracy of a drive support portion" and "deep and good appearance of an outer surface portion" can both be achieved, which makes it possible to effectively use a die-cast material as fishing reel components required to have various qualities.

In the above configuration, examples of a "support member having a higher corrosion resistance than a die-cast material" include a stainless-steel alloy, aluminum alloy+alumite, synthetic resin, ceramics and copper-based alloy. Further, in the above configuration, the "drive member" means a rotatable member that is involved in driving a fishing reel, the examples of which are a handle shaft, spool shaft and pinion shaft.

Further, in the above configuration, the support portion may form a precision finishing portion of the body member. The "precision finishing portion" means a portion of a fishing reel component for which a predetermined (generally high) finishing dimensional accuracy is required, and may include, for example, a portion of a bearing that supports a driving rotary shaft with a gear, and a rotation support portion. The portions of the body member other than the support portion may form a surface portion. The "surface portion" means a surface portion of a fishing reel component excluding the precision finishing portion, the examples of which include, for example, the inner/outer surfaces of a reel body, the inner/outer surfaces of a cover member, spool and rotor that are attached to the reel body, the outer surface of a bale, the inner/outer surfaces of a handle, and drag adjustment components, including not only an outer surface portion exposed to the external environment but also an inner surface (interior surface) portion not exposed to the external environment.

Further, in the above configuration, the support member may have an inner peripheral surface to which a bearing that rotatably supports the drive member is fitted, and may be fixed to the fitting portion (inner peripheral portion or outer peripheral portion) of the body member. In this confirguration, the support member may be fitted and fixed to a machined fitting portion of the body member. If the machined portion of the body member is kept in the waterproof area, the processed die-cast material does not encounter the corrosion-causing substances (e.g., water and seawater), which can prevent corrosion. Further, in this configuration, the waterproof performance can be further improved by covering the machined portion of the body member in the waterproof area with a covering body and arranging the support member as an anticorrosion member so as to be polymerized with the covering body.

Further, in the above configuration, the inner peripheral surface to which the bearing of the support member is fitted may be machined with the support member being fixed to the body member. Again, as described above, since the support member to be machined has a corrosion resistance, the surface treatment after machining (corrosion resistance treatment; alumite treatment) is not required. Further, in the above configuration, only the support member with corrosion resistance may be machined by applying a coating layer and an anticorrosion layer on the surface of a portion in which the support member with corrosion resistance is insert-molded to the portion of the body member that requires high accuracy.

Our manufacturing method of fishing reel components provides the above-described features.

We, thus, provide fishing reel components and a manufacturing method thereof that can achieve not only highly accurate finishing dimensions, but also a deep and glossy metallic appearance while maintaining sufficient corrosion resistance at a precision finishing portion that rotatably supports a drive member, and that can increase the work efficiently of the entire surface treatment.

DESCRIPTION OF THE NUMERICAL REFERENCES

Figure 1:
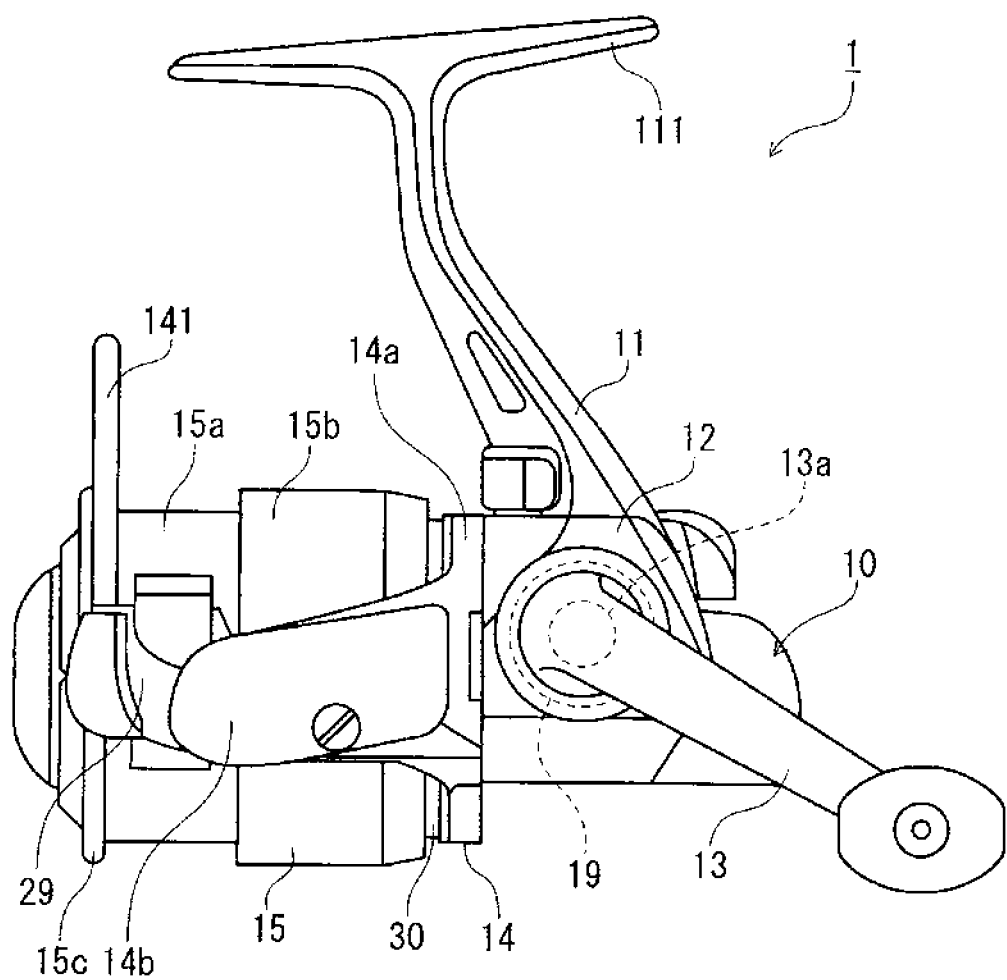
FIG. 1 is a schematic side view showing a spinning reel as a fishing reel having components according to an example.

10 Reel body (fishing reel components)
12 Body cover (fishing reel components)
20 Die-cast material
21 Coating layer
22 Anticorrosive layer
40 Support portion
40A Support member
40Aa Inner peripheral surface
50 Body member
50a Fitting portion
P Precision finishing portion
F Surface portion

DETAILED DESCRIPTION

Hereinafter, fishing reel components according to an example will be described with reference to the accompanying drawings.

First, prior to describing the fishing reel components according to one example, the schematic configuration of the fishing reel will be described with reference to FIGS. 1, 7(a)-7(c) and 9, using a spinning reel as an example.

Figure 10A:
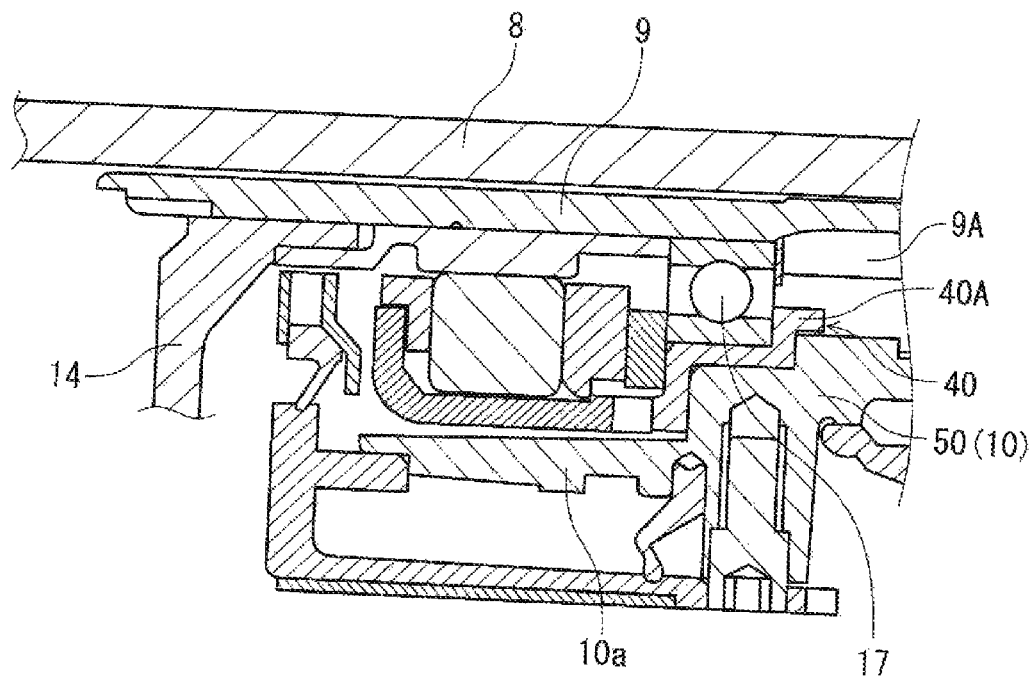
FIG. 10(a) is a cross-section view showing a drive mechanism unit (drive mechanism portion) according to a specific example of a waterproof area.

As shown in FIG. 1, a spinning reel 1 as a fishing reel has a reel body 10 having a spool shaft 8 and a drive shaft cylinder 9 that protrude forward (see FIG. 10(a)), and a leg portion 11 having a rod attaching portion 111 attached to a fishing rod (not illustrated) is formed extending from the reel body 10, and a body cover 12 is detachably attached to a portion of said leg portion. The reel body 10 including the leg portion 11 and the body cover 12 is formed using, for example, a die-cast material as described later.

Further, the reel body 10 is provided with a rotor 14 and a spool 15 around which a fishing line is wound. In this configuration, the rotor 14 is fixed to the front end of the drive shaft cylinder 9 as is well known (see FIG. 10(a)), and the spool 15 is attached to the front end of the spool shaft 8.

The reel body 10 rotatably supports a handle shaft 13a (see FIGS. 1 and 8), and the handle shaft 13a extends in the left-right direction in the reel body 10. A drive gear 19 is integrally provided on the handle shaft 13a, so that the drive gear 19 rotates with the rotation of the handle shaft 13a. The end of the handle shaft 13a protrudes to the side of, and through, the reel body 10, and a handle 13 is attached to the end of the protruding handle shaft 13a.

As shown in FIGS. 10(a) and (b), the drive shaft cylinder 9 rotatably supported via a bearing 17, and the spool shaft 8 inserted into the drive shaft cylinder 9 are provided in a cylindrical portion 10a provided in the front side of the reel body 10.

The rotor 14 is fixed to the front end of the drive shaft cylinder 9, and a pinion gear 9A meshing with the drive gear 19 is formed at the rear end of the drive shaft cylinder 9. Therefore, when rotating the handle 13, the rotational driving force is transmitted to the drive shaft cylinder 9 via the drive gear 19 and the pinion gear 9A so that the rotor 14 rotates together with the drive shaft cylinder 9.

As shown in FIG. 1, the rotor 14 includes a cylindrical portion 30 located on the outer peripheral side of the cylindrical portion 10a of the reel body 10, and a pair of arm portions 14b. A bale 141 that picks up a fishing line extending to the spool 15 and bale support members 29 that supports a line roller (not illustrated) are rotatably attached to the front end of each of the arm portions 14b (only one of the arm portions is visible in FIG. 1) so that the posture of the bale 141 is switched between the fishing line-winding posture and the fishing line-unwinding posture as the bale support members 29 (only one of the base support members is visible in FIG. 1) rotate between the fishing line-winding position and the fishing line-unwinding position.

The spool 15 is attached to the front end of the spool shaft 8 via a drag mechanism (not illustrated). The spool 15 has a fishing line winding body 15a around which a fishing line is wound, a skirt portion 15b provided at the rear of the fishing line winding body 15a, and a front flange 15c provided in the front side of the fishing line winding body 15a.

The rear end of the spool shaft 8 is connected to a spool-reciprocating device of known configuration provided in the reel body 10. Therefore, when the winding operation of the handle 13 is carried out, the rotational motion from the handle shaft 13a is converted into linear motion, thereby moving (reciprocating) the spool 15 back and forth. Accordingly, a fishing line (not illustrated) picked up by the bale 141 is evenly wound around the fishing line winding body 15a of the spool 15 via the line roller in conjunction with the rotation of the rotor 14 described above with the winding operation (rotation operation) of the handle 13.

Next, the components of the spinning reel 1 will be described.

The spinning reel 1 has, as described above, components each of which is a single member component (e.g., the reel body 10, the body cover 12, the rotor 14, the handle 13 and the exterior member), the components are formed of a die-cast material, and a surface treatment is applied to relevant portions depending on the required functions (high-precision support of a drive member, deep and glossy appearance and color tone, corrosion resistance).

Figure 4:
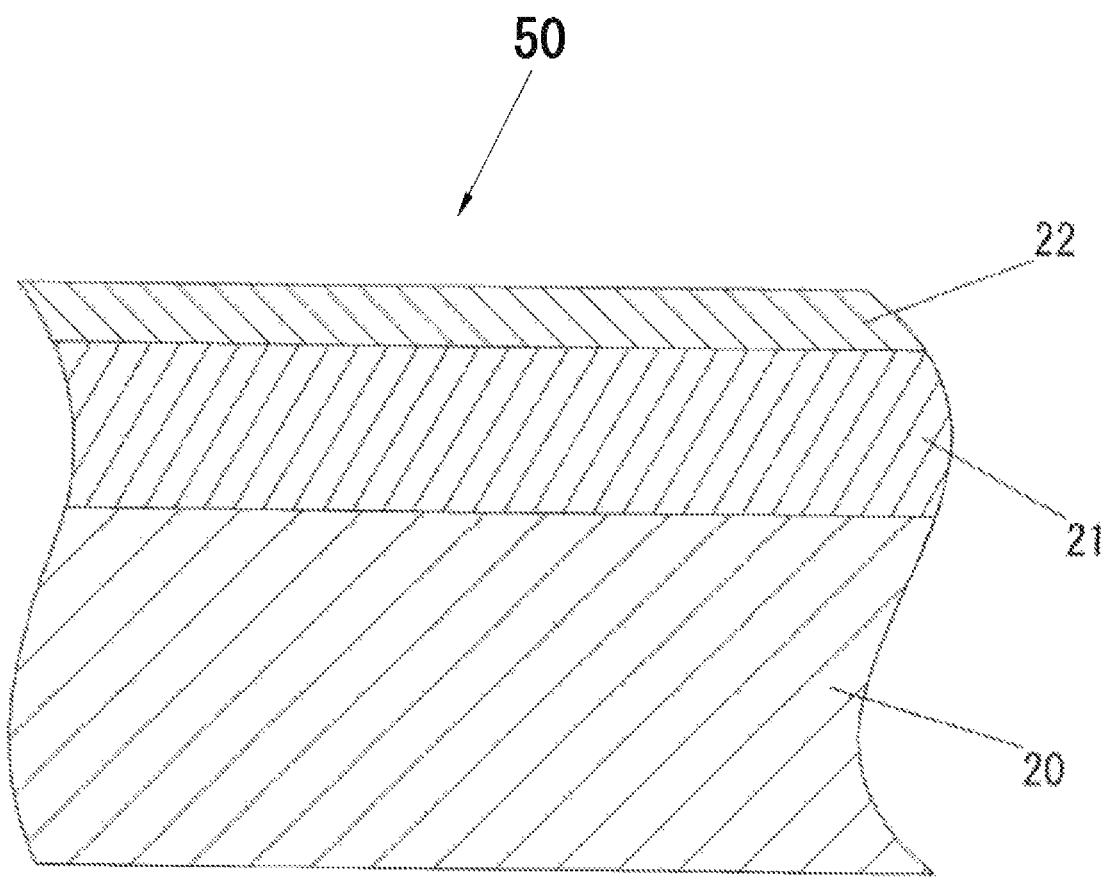
FIG. 4 is a cross-section view showing a laminated structure on the surface of the body member of a fishing reel component according to an example.

Among such components, the reel body 10 including the leg 11 is formed of a die-cast material as described above, and includes a body member 50 with a surface treatment area including a coating layer 21 formed of higher-purity aluminum than that of the die-cast material 20 on the die-cast material 20, and an anticorrosion layer 22 formed by anodization on the coating layer 21 as shown in FIG. 4.

Figure 2:
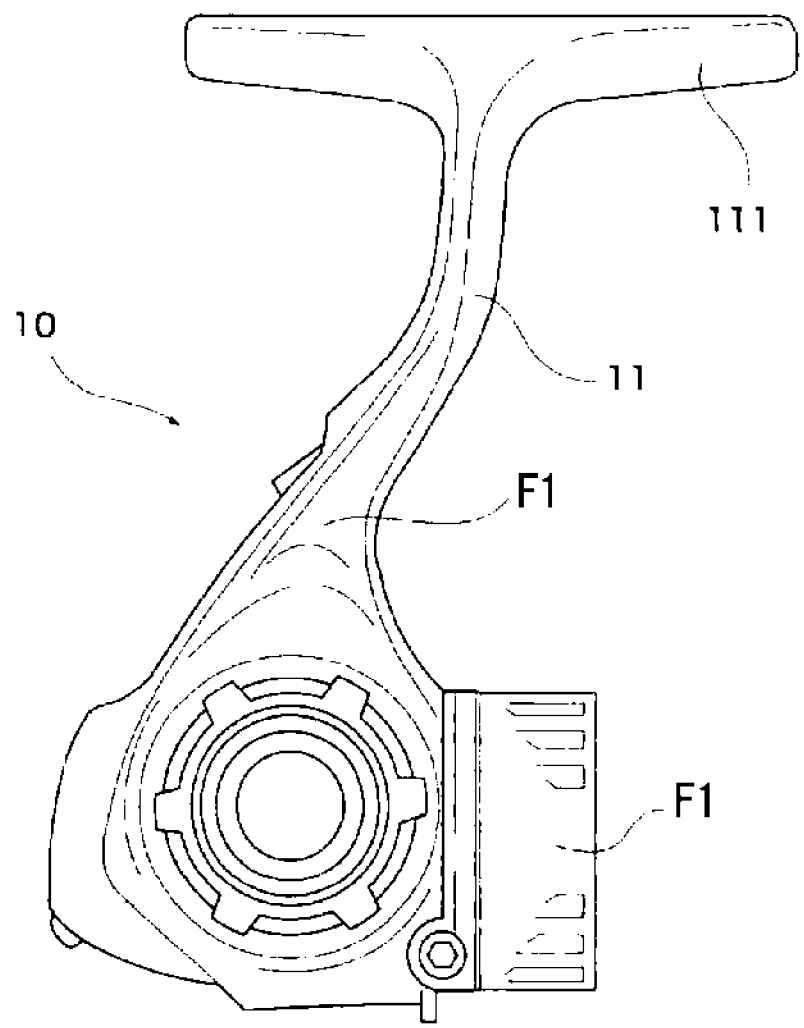
FIG. 2 is a side view showing the reel body of the spinning reel in FIG. 1 primarily with an outer surface portion, as viewed from its outside.
Figure 3:
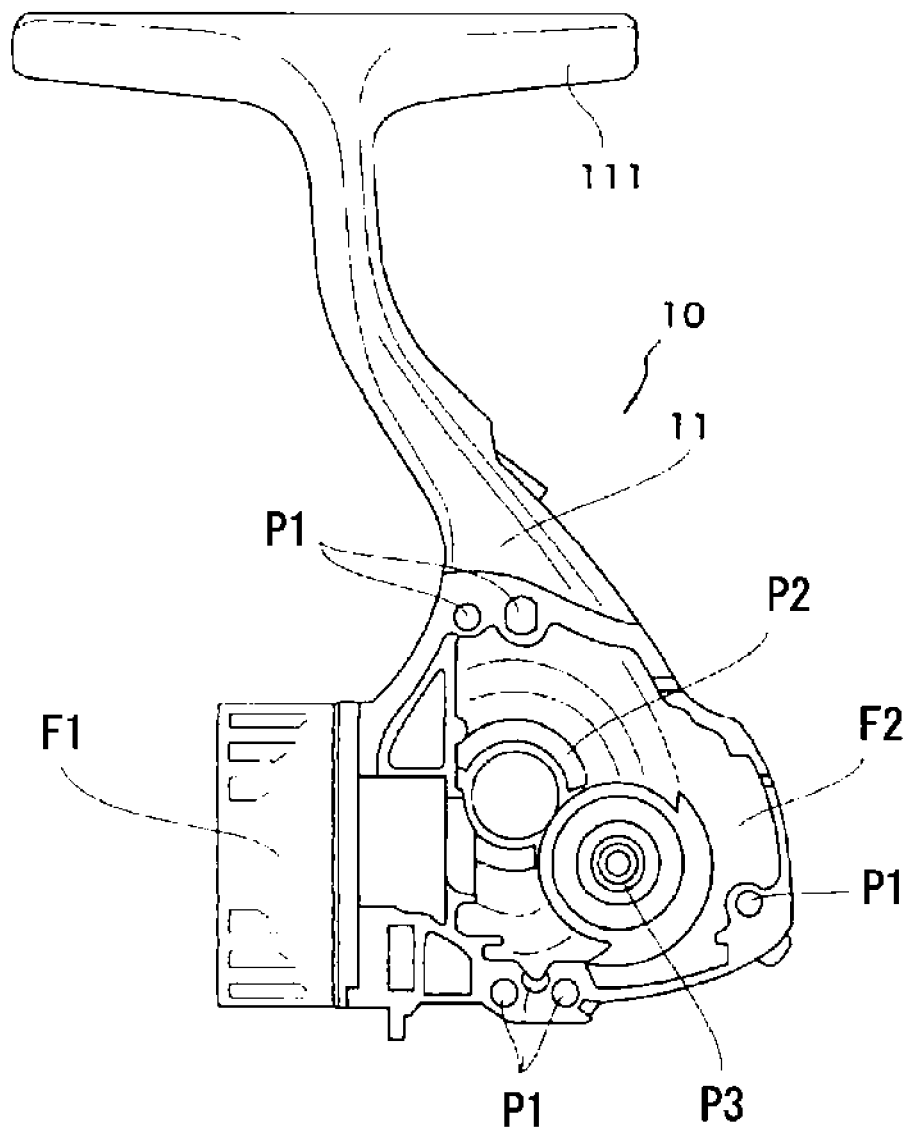
FIG. 3 is a side view showing the reel body of the spinning reel in FIG. 1 primarily with an inner surface portion and a precision finishing portion, as seen from its inside.

Further, as shown in FIGS. 2 and 3, the reel body 10 has a precision finishing portion P for which a predetermined finishing dimensional accuracy is required, and a surface portion F excluding the precision finishing portion. The precision finishing portion P here means a portion of the reel body 10 for which a predetermined (generally high) finishing dimensional accuracy is required, and includes a support portion rotatably supporting a drive member via a bearing portion such as an built-in/machining certificate and a screw hole P1, a bearing installation portion P2 supporting the handle shaft 13a (drive member), and a support portion P3 of a gear. The surface portion F is a surface portion of the reel body 10 excluding the precision finishing portion P and includes an outer surface portion F1 exposed to the external environment and an inner surface portion F2 not exposed to the external environment. The precision finishing portion and surface portion are also present in other reel components, such as the body cover 12. The technical idea is to be applied to a supporting portion that rotatably supports a drive member among the precision finishing portions such as the reel body 10 and the body cover 12.

Figure 5:
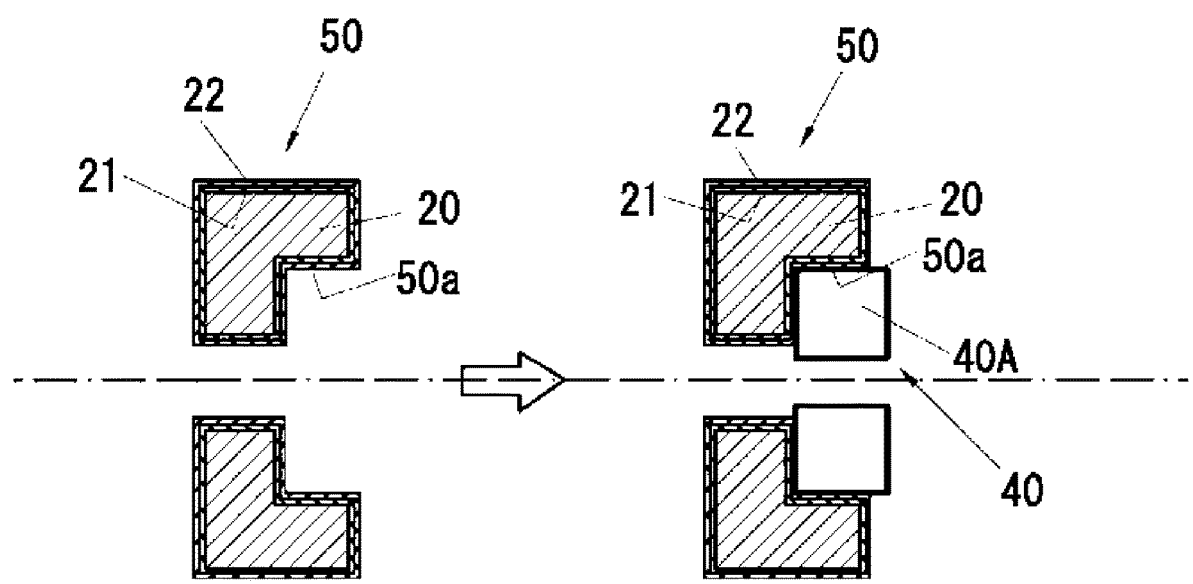
FIG. 5 is a conceptual diagram of the present invention in which a support portion (support member) is fixed to a body member having a coating layer and an anticorrosion layer on its surface.
Figure 6:
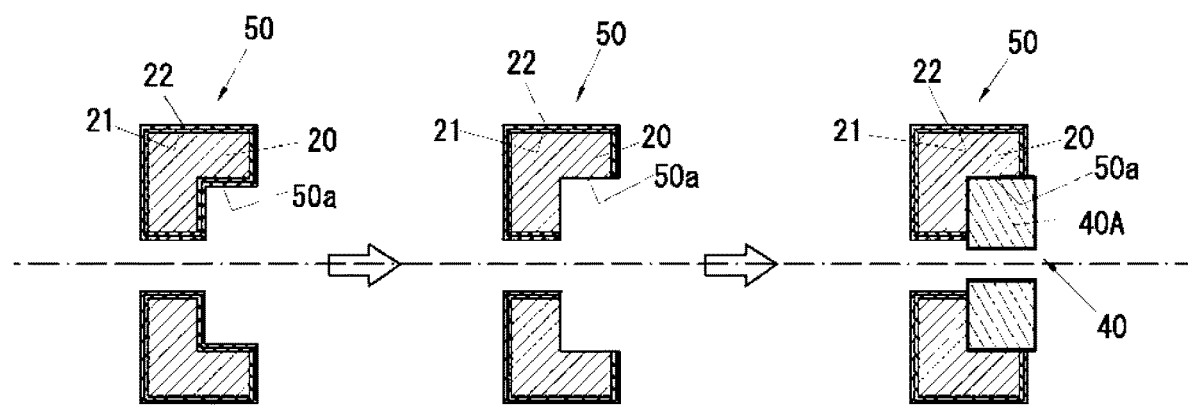
FIG. 6 is a conceptual diagram of the present invention in which a support portion (support member) is fixed to a processed body member having a coating layer and an anticorrosion layer on its surface.

FIGS. 5 and 6 conceptually show the technical idea of our components and methods. As illustrated, fishing reel components formed of a die-cast material has, as described above, the body member 50 having the coating layer 21 formed of higher-purity aluminum than that of the die-cast material 20 on the die-cast material 20, and the anticorrosion layer 22 formed by anodization on the coating layer 21. Then, the body member 50 is provided with a support portion 40 that rotatably supports a drive member, and the support portion 40 independent from the body member 50 is formed by a support member 40A having a higher corrosion resistance than the die-cast material of the body member 50. Examples of a rotatable drive member include, for example, a handle shaft, spool shaft and pinion shaft of a fishing reel, and in the spinning reel 1, the handle shaft 13a and the drive shaft cylinder 9 described above correspond to the drive member.

As shown in FIG. 5, the support member 40A may, with it being set to a jig with the body member 50 to have no core misalignment, also be fixed and attached by know fixing means to the fitting portion (opening) 50a of the body member 50 with the coating layer 21 and the anticorrosion layer 22. Alternatively, as shown in FIG. 6, the support member 40A may be fitted and fixed to the fitting portion (opening) 50a machined with reference to a machining certificate of the body member 50. In this configuration, in machining the fitting portion 50a, the coating layer 21 and the anticorrosion layer 22 may, as illustrated, be removed from the die-cast material 20 by cutting. If the machined portion of the body member 50 to which the support member 40A is fitted and fixed is sealed to not contact the outside air, and kept in a waterproof area, the processed die-cast material 20 does not come in contact with corrosion-causing substances (e.g., water and seawater), which can prevent corrosion. Further, in this configuration, the waterproof performance can be further improved by covering the machined portion of the body member 50 in the waterproof area with a covering body (not illustrated) and arranging the support member 40A as an anticorrosion member so as to be polymerized with the covering body.

Figure 11:
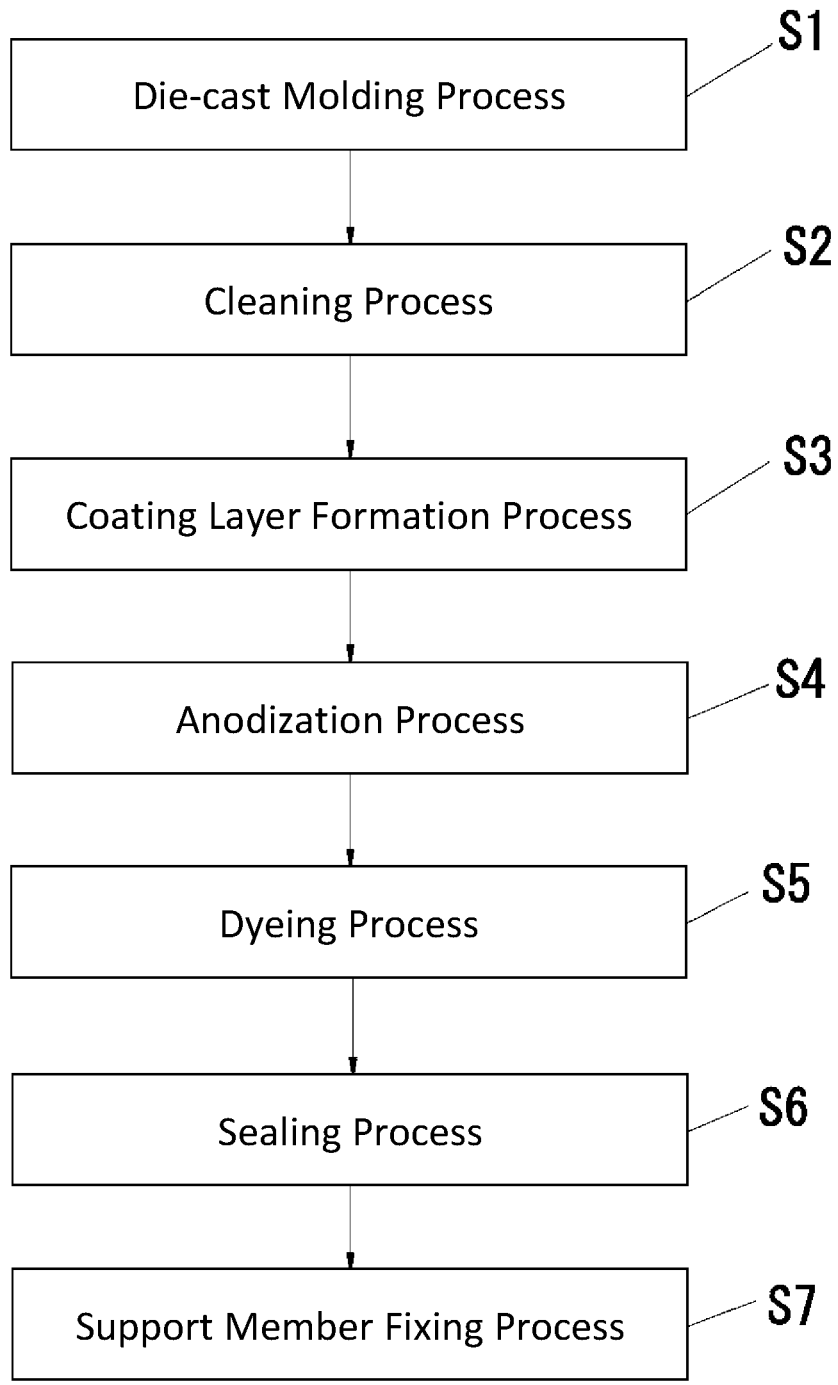
FIG. 11 is a flowchart showing an example of a surface treatment process.

As shown in FIG. 5, when the support member 40A is fixed and attached directly to the fitting portion 50a of the body member 50 with the coating layer 21 and the anticorrosion layer 22 as shown in FIG. 11, in a die-cast molding process (molding step) S1, a molding (die-cast material) 20 of a desired shape is first formed by a well-known die casting method in which a die-cast material such as an aluminum alloy (e.g., ADC1, ADC3, ADC10 and ADC12) containing, for example, silicon (Si) of 7% or more is melted, poured into a mold, and casted under high pressure. Subsequently, the die-cast molding 20 is subjected to a well-known degreasing and chemical polishing treatment in a cleaning process S2 and then, is transferred to an aluminum coating layer formation process S3.

In the coating layer formation process (coating layer formation step) S3, powder particles of higher-purity aluminum than that of the die-cast material, for example, aluminum with 99% or more purity (pure Al), are sprayed onto the surface of the molding 20 to form the coating layer 21 with a thickness of 10 μm to 100 μm. A well-known impact coating formation process called cold spray method is desirable as a spraying method of the aluminum powder particles to obtain a smooth and even surface. The coating layer 21 is formed by spraying, for example, the entire surface of a reel component. Further, the coating layer 21 may also be formed by vapor deposition, in particular by physical vapor deposition such as single wafer processing and badge processing. In this way, it is possible to maintain a large thickness of the coating layer 21. In this configuration, it is advantageous to form micro irregularities on the surface of the molding 20 in advance and laminate the coating layer 21 as this increases the adhesion of the coating layer 21 to the molding 20. The surface of the coating layer 21 formed on the molding 20 is subjected to polishing treatment such as barrel, shot and buff treatments.

The coating layer 21 with a thickness of, for example, 10 μm to 100 μm can prevent an impact of a die-cast material when aluminium particles are sprayed onto the molding 20, and can also keep coating unevenness to a minimum whereby the desired dimensional accuracy of the product can be maintained.

Next, anodization (e.g., alumite treatment) is performed on the entire surface (including the coating layer 21) of the molding 20 on which the coating layer 21 is formed to form an alumite layer 22, which is an anticorrosion layer, on its surface including the coating layer 21 in an anodization process (process of forming an anticorrosion layer) S4.

With respect to the molding 20 on the surface (including the coating layer 21) of which the alumite layer 22 is formed, the alumite layer 22 on the coating layer 21 becomes harder (e.g., Vickers hardness of approximately Hv500 to 800) due to the action of the coating layer 21. Similarly, due to the action of the coating layer 21, the abrasion resistance of the alumite layer 22 on the coating layer 21 of the molding 20 is also enhanced compared to when it is formed directly on a die-cast material, and the alumite layer presents a glossy metallic appearance.

As a result, the alumite layer 22 on the coating layer 21 is hardly scratched or otherwise damaged, and moreover, can prevent contamination, corrosion, rust and the like as it is glossy.

The molding 22 on which the alumite layer 22 is formed by anodization is subjected to a dyeing treatment on, for example, a desired peripheral surface in a dyeing process S5, as necessary, and then subjected to a sealing treatment in a sealing process S6 whereby a finished product is produced as a component, for example, the reel body 10.

Thereafter, in a support member fixing process (fixing step) S7, the support member 40A having a higher corrosion resistance than the die-cast material 20 of the body member 50 is fitted and fixed to, for example, the fitting portion 50a of the body member 50.

Figure 12:
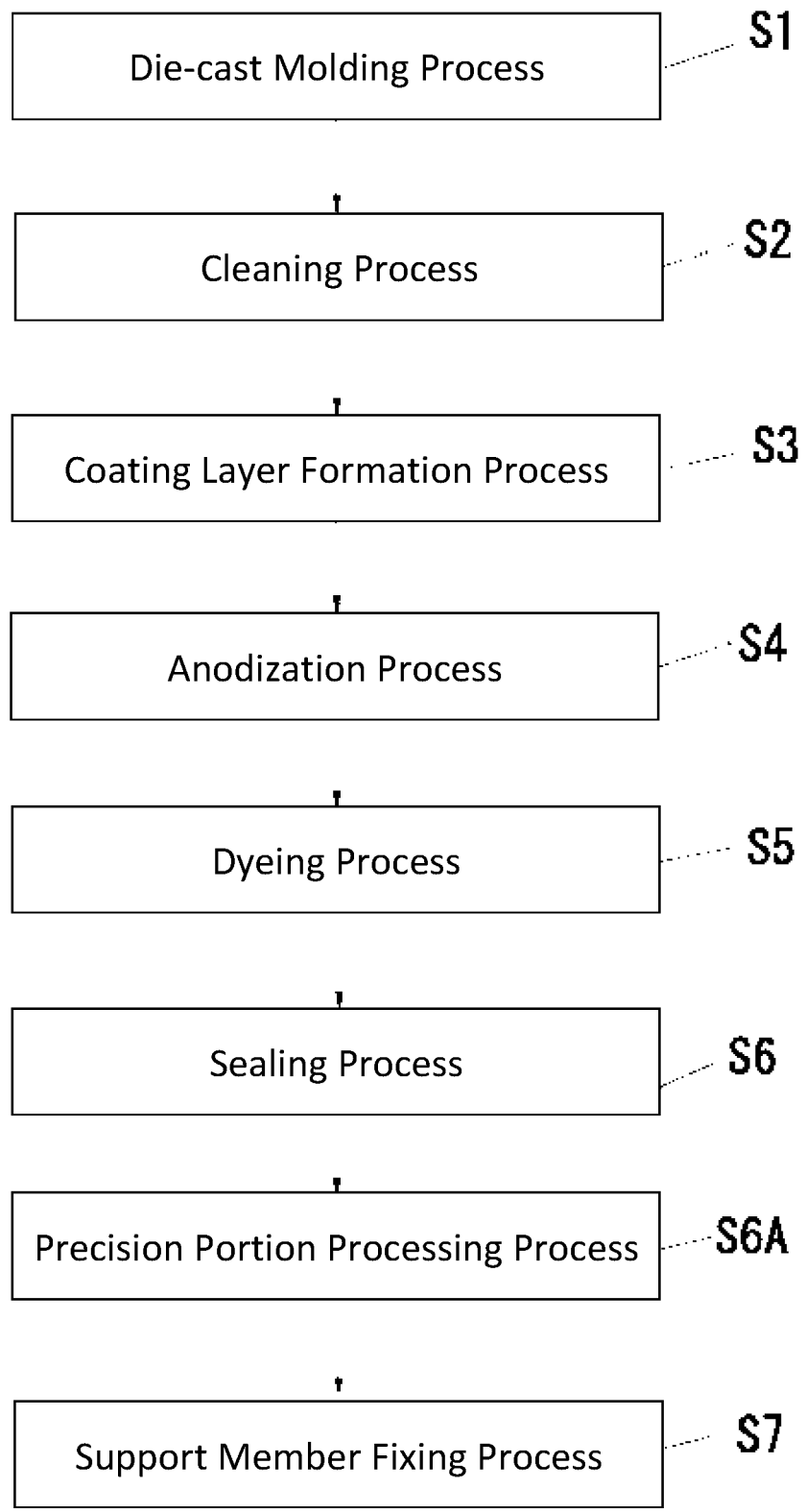
FIG. 12 is a flowchart showing another example of a surface treatment process.
Figure 13:
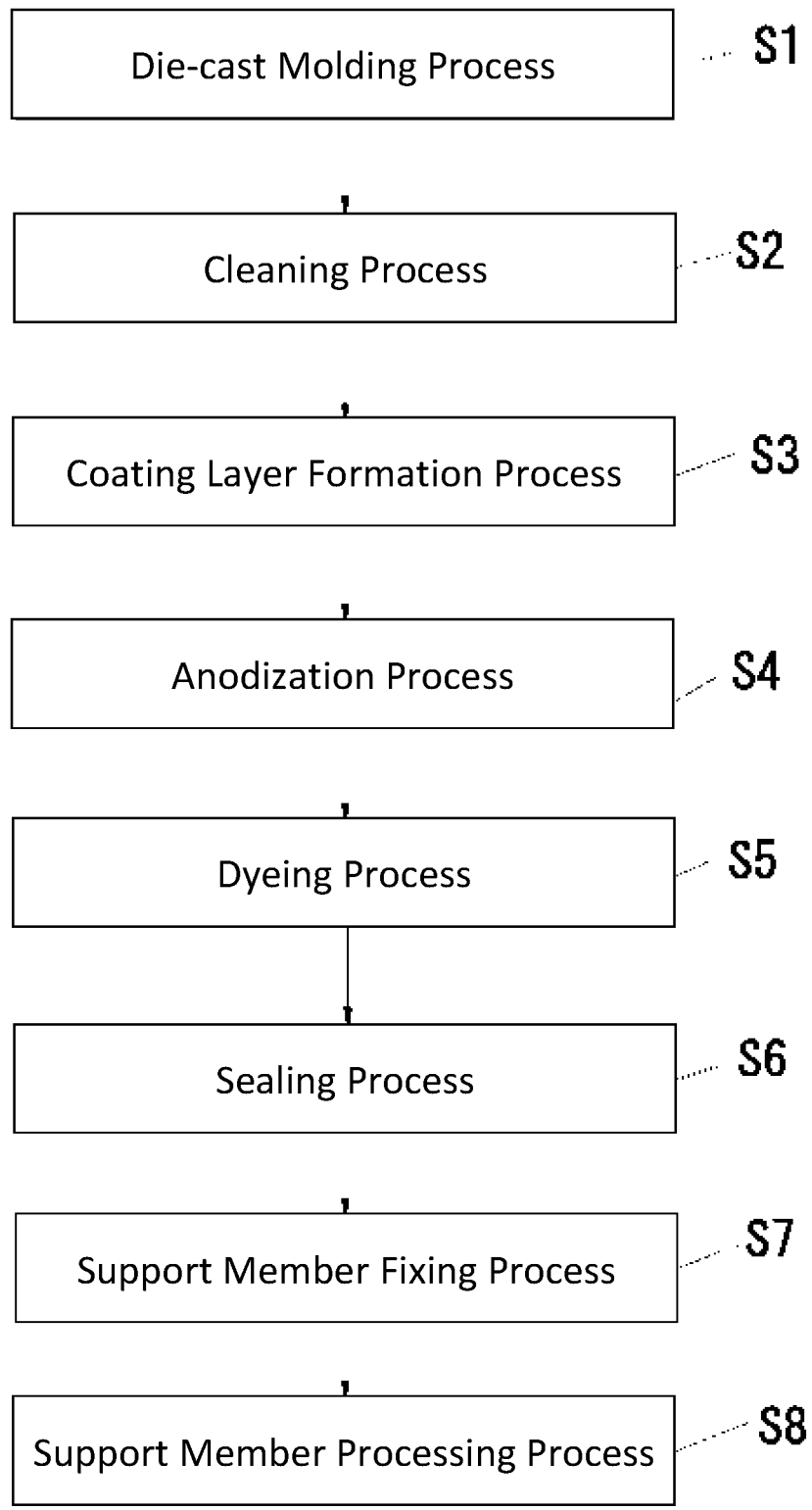
FIG. 13 is a flowchart showing still another example of a surface treatment process.

When, as shown in FIG. 6, the support member 40A is fixed to the machined fitting portion 50a of the body member 50, after the above-described processes S1 to S6 as shown in FIG. 12, the fitting portion 50a of the body member 50 is subjected to machining, for example, precision finishing to provide a highly accurate dimension in the precision processing process S6A, and then, the support member 40A is fitted and fixed to the fitting portion 50a of the body member 50 in the support member fixing process S7. In either example, a support member processing process S8 for performing precision finishing on the support member 40A may be performed following the support member fixing process S7 as shown in FIG. 13.

It is important to control the thicknesses of the coating layer 21 and the alumite layer (anticorrosion layer) 22 to obtain surface characteristics dedicated to any of glossiness, corrosion resistance, abrasion resistance and scratch resistance following anodization. For example, the thicknesses of the coating layer 21 and the alumite layer 22 may be set to 10 μm or less, and 5 μm or less, respectively, to improve glossiness and the like. The thinner the coating layer 21 is, the smoother the surface of the coating layer 21 will be. Further, the thinner the alumite layer 22 is, the lower the corrosion resistance will be, but to have high glossiness, physical polishing (buff) or chemical polishing may be performed after the coating layer 21 is formed and then, the alumite layer 22 may be formed with a thickness of 5 μm or less. Alternatively, high high glossiness can also be obtained also by setting the thicknesses of the coating layer 21 and the alumite layer 22 to 30 μm or more, and 5 μm or less, respectively.

To obtain surface characteristics dedicated to corrosion resistance, it is preferable to set the thicknesses of the coating layer 21 and the alumite layer 22 to 15 μm or less, and 10 μm or more, respectively. Further, to obtain abrasion resistance and scratch resistance in addition to corrosion resistance, it is preferable to set the thicknesses of the coating layer 21 to 15 μm or less, and have hard alumite with a thickness of 10 μm or more for the alumite layer 22.

Further, it is also possible to obtain alumite with a highly glossy appearance using a die-cast material other than ADC. For example, the coating layer 21 and the alumite layer 22 may be formed on a magnesium alloy material. In this configuration, a coating layer may be formed following anodization with a liquid for magnesium processing, and then an alumite treatment may be performed on the coating layer. This is an alternative to electrodeposition coating and also provides a decorative appearance (decorative coating becomes no longer required). Alternatively, a resin component may be coated with pure Al and subjected to an alumite treatment. In this configuration, the resin is made of a non-conductive resin so that the alumite treatment can be performed.

Next, an example having a specific portion will be described.

Figure 7A:
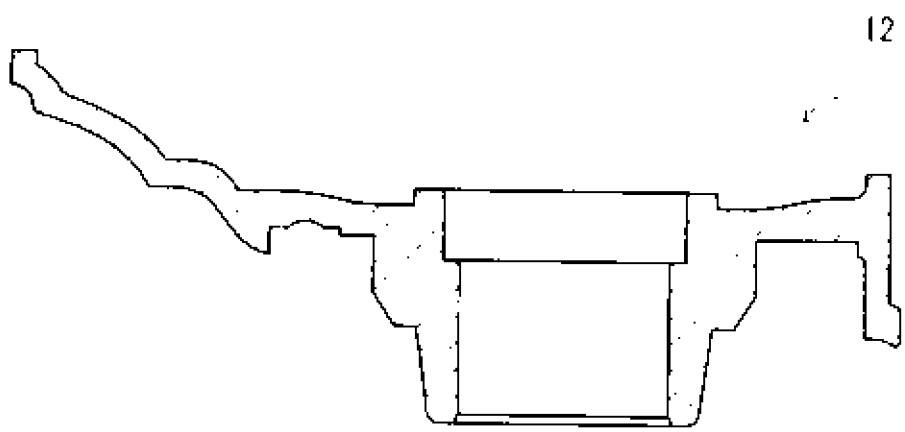
FIGS. 7(a)-7(c) are specific examples of a body cover, wherein (a) is a cross-section view showing a conventional integrated body cover; and (b) and (c) are cross-section views showing body covers with separate support portions.
Figure 7B:
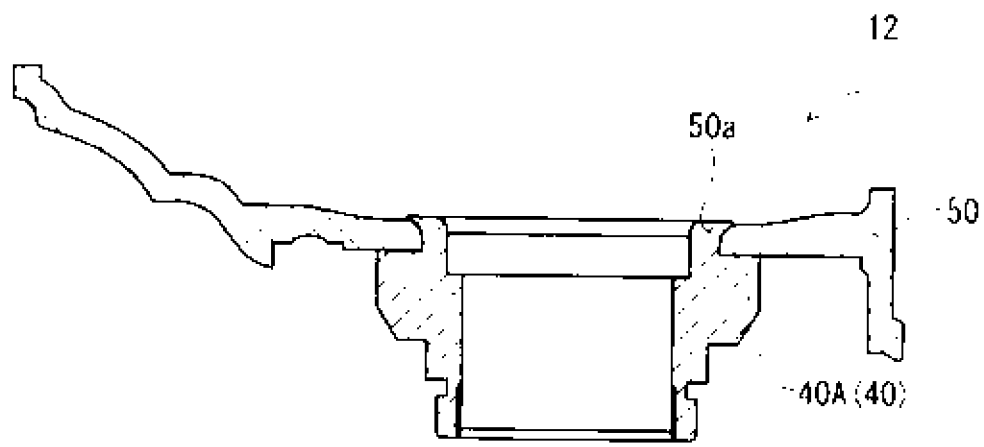
Figure 7C:
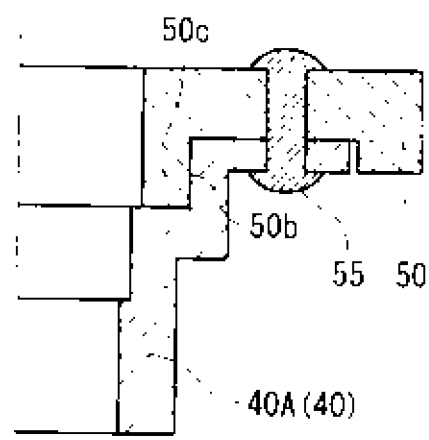

FIGS. 7(a)-(c) show a specific example applied to the body cover 12 as a reel component. Although general body cover 12 is, as shown in FIG. 7(a), formed as a single integral member, in this example, as shown in FIGS. 7(b) and 7(c), the body cover 12 consists of the support member 40A constituting the support portion 40 that rotatably supports one end side of the handle shaft 13a as a drive member via a bearing (not illustrated), and the body member 50 attached to the reel body 10. As described above, the body member 50 includes the coating layer 21 and the anticorrosion layer 22, and the support member 40A is attached to the opening shown in FIG. 7(b) or an outer peripheral portion 50b of a cylindrical portion 50c shown in FIG. 7(c), which constitute the fitting portion 50a of the body member 50 with or without precision finishing. Examples of the attaching method include known fixing means such as press-fitting, caulking, bonding and screwing (in FIG. 7(c), the attachment is performed with a rivet 55). Further, the body member 50 is assembled to the reel body 10 with reference to, for example, a machining certificate or a built-in certificate, thereby ensuring positional accuracy.

Figure 8:
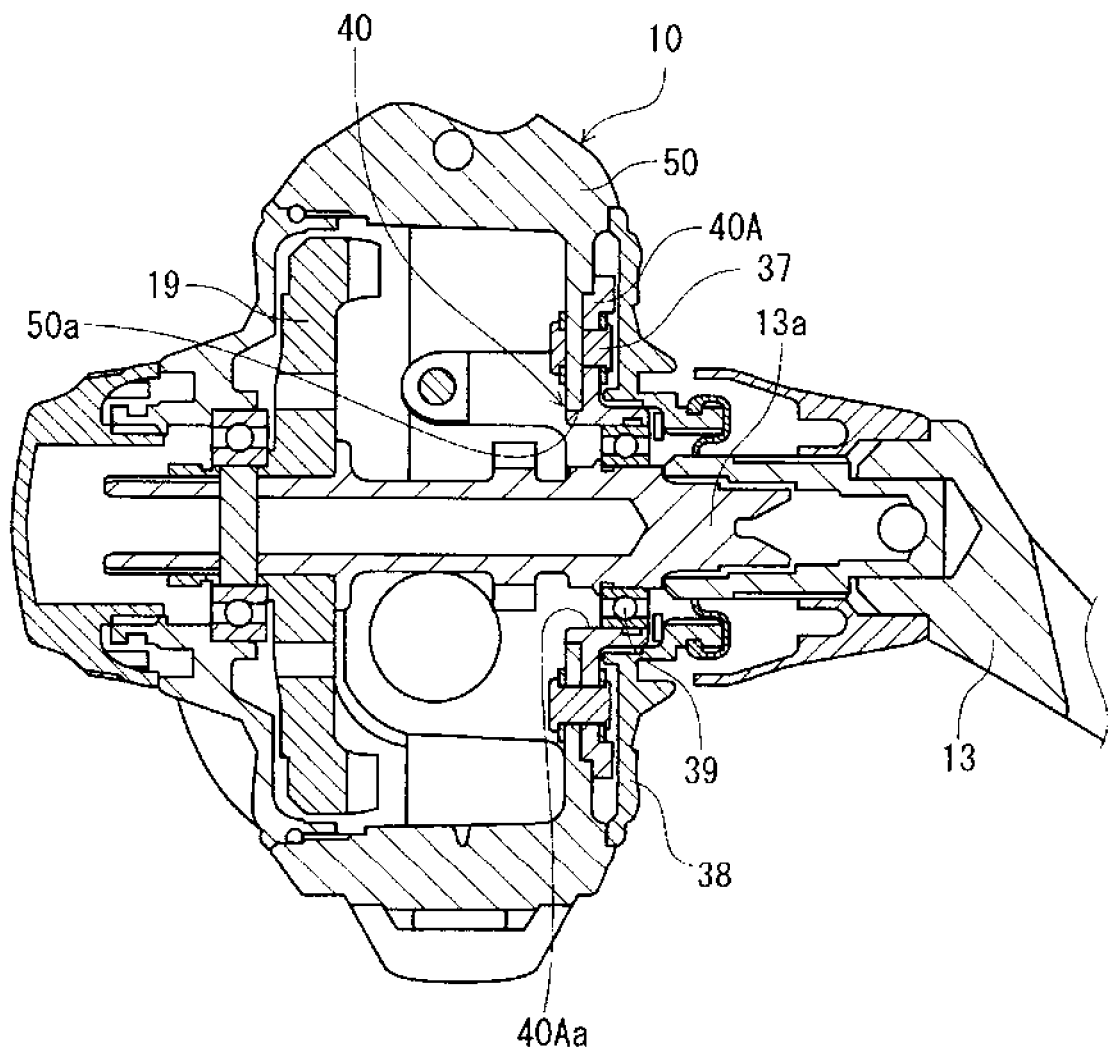
FIG. 8 is a cross-section view showing a reel body according to a specific example.

FIG. 8 shows a specific example applied to the reel body 10 as a reel component. As illustrated, in the reel body 10, a cover body 38 that also supports and retains a bearing 39 supporting the handle shaft 13a by covering the outside of the support portion 40 of the handle shaft 13a is attached and fixed by a screw member (not illustrated) to the reel body 10. The support member 40A forming the support portion 40 has an inner peripheral surface 40Aa to which the bearing 39 rotatably supporting the handle shaft 13a as a drive member is fitted, and is fitted and fixed by a rivet 27 to the fitting portion 50a of the body member 50 constituting the reel body 10 with it being set to a jig so as to have no core misalignment. The body member 50 includes the coating layer 21 and the anticorrosion layer 22 as described above, and the fitting portion 50a of the body member 50 may or may not be subjected to precision finishing.

Figure 9:
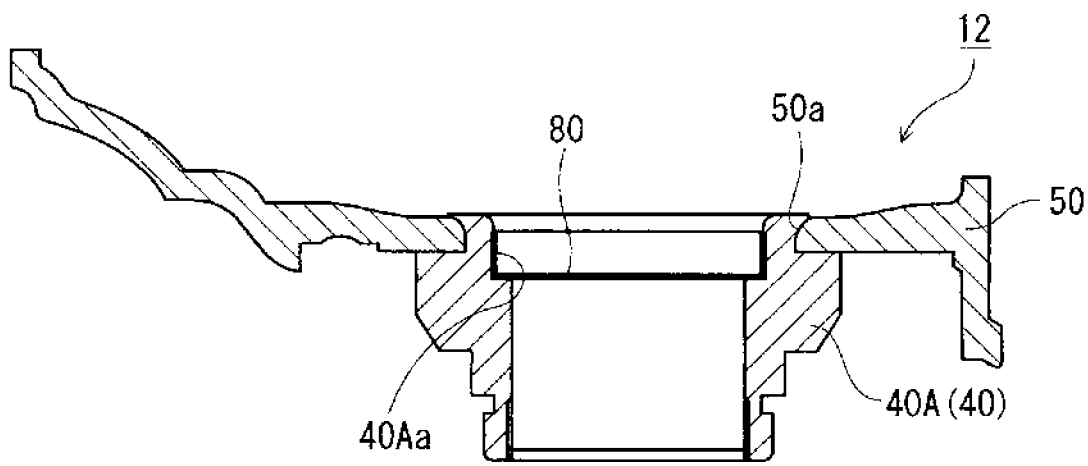
FIG. 9 is a cross-section view of a body cover according to a specific example.

FIG. 9 is also a specific example applied to the body cover 12 as a reel component, similar to FIG. 7(a). As illustrated, the body cover 12 includes the support member 40A constituting the support portion 40 that rotatably supports the one end side of the handle shaft 13a as a drive member via a bearing (not illustrated), and the body member 50 that is attached to the reel body 10, and that has the coating layer 21 and the anticorrosion layer 22. Further, in this example, the inner peripheral surface 40Aa of the support member 40A to which the bearing is fitted is machined with the support member 40A fixed to the body member 50 being set to a jig with reference to a machining certificate (in the drawing, the portion denoted by reference numeral 80 and shown by a thick line is the machined portion). It is possible to maintain a desired positional accuracy after the support member 40A is assembled to the body member 50 by machining (precision finishing) a portion of the inner peripheral surface 40Aa for which high dimensional accuracy is required to receive the bearing. Although the entire support member 40A may be formed of a corrosion-resistant material such as SUS, unnecessary weight increase can be prevented by forming only the portion of the inner peripheral surface 40Aa that receives the bearing with SUS and forming the other portions with a corrosion-resistant member such as anodized aluminum.

Figure 10B:
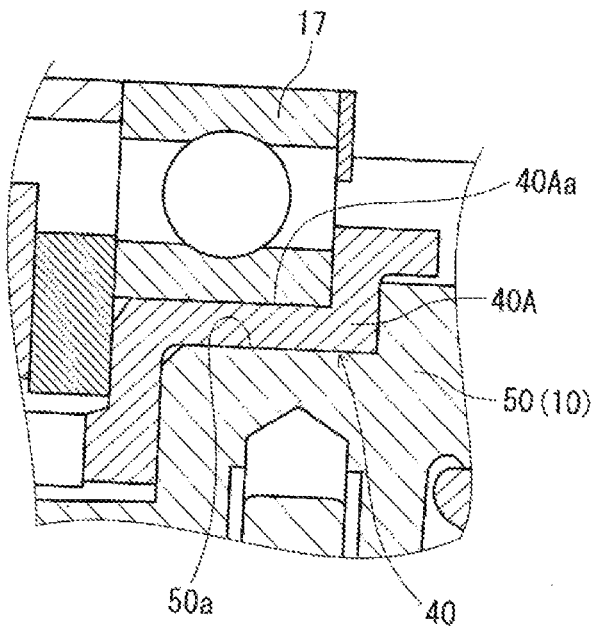
FIG. 10(b) is an enlarged cross-section view showing the main part of FIG. 10(a).

FIGS. 10(a) and 10(b) show a specific example applied to the reel body 10 as a reel component. As illustrated, in this example, the support member 40A as a collar member is fitted and fixed to the fitting portion 50a of the body member 50 constituting the reel body 10 to form the support portion 40, and the support member 40A has the inner peripheral surface 40Aa to which the bearing 17 rotatably supporting the drive shaft cylinder 9 as a rotatable drive member is fitted. The body member 50 here includes the coating layer 21 and the anticorrosion layer 22 as described above, the fitting portion 50a of the body member 50 is subjected to precision finishing after said layers are formed and then, the precision finishing portion is kept in the waterproof area. In other words, the precision finishing portion is covered by the support member 40A as a collar member to form the waterproof area. Possible examples of the formation of the waterproof area include those using an adhesive (bonding the support member 40A to the fitting portion 50a of the body member 50), and a sealing material (O-ring, caulking material).

Described above, according to this example, as disclosed in the above-mentioned Japanese Patent Application Publication No. 2019-122273, the drive member can be rotatably supported by the support portion 40 with the anticorrosion layer 22 provided on a die-cast material via the coating layer 21, that is, by the support portion 40 that has a higher corrosion resistance than the die-cast material 20 and that is provided on the anticorrosion layer 22 capable of maintaining a sufficient thickness due to the interposition of the coating layer 21, instead of rotatably supporting the drive member as a support portion that is part of the body member (precision finishing portion) with only a thin anticorrosion layer formed by anodization directly on a die-cast material with a large amount of additives so that the support portion 40 can exhibit sufficient corrosion resistance even under severe use conditions in a fishing spot environment where seawater, water, foreign matter or the like easily adhere thereto, which avoids causing restrictions on the conditions of, and environment for, the use of a fishing reel. Further, since the support portion 40 is formed from the support member 40A independent from the body member 50, it is possible to achieve highly accurate finishing dimensions at the support portion 40 by providing a high dimensional accuracy to the support member 40A.

In addition, according to this example, the anticorrosion property and the rust-proof property of the anticorrosion layer 22 on the coating layer 21 formed by anodization are enhanced by the action of the coating layer 21 of high-purity aluminum, and a deep and glossy metallic appearance is obtained with the enhanced surface hardness. Moreover, as the die-cast material is made of an aluminum alloy (e.g., ADC1, ADC3, ADC10 and ADC12), the adhesion of the coating layer 21 to the body member 50 is increased by the bonding between the aluminum portions whereby the corrosion resistance of the anticorrosion layer 22 is further improved.

Further, according this example, it is not necessary to perform anodization (alumite treatment) over multiple times and also, even if the support member 40A is machined, damage (e.g., decoloration and deterioration) to the existing anodized coating (anticorrosion layer) 22 can be avoided (the corrosion resistance is not lost) since the support member 40 has a corrosion resistance whereby quality improvement can be achieved. Moreover, less surface treatment can reduce the cost and also improve the work efficiency of the entire surface treatment process.

This disclosure is not limited to the examples described above, and various variations may be made to the extent of not departing from the spirit thereof. For example, though in the examples described above, our techniques are applied to spinning reel components and components of other types of fishing reels such as double bearing reels. Further, in the above-mentioned examples, the method of forming the aluminum coating layer 21 into the molding 20 made of a die-cast material is explained using a configuration where a coating layer is spray formed by a shot coating method. However, the method is not limited to the foregoing, and the layer may also be formed by vapor deposition, thermal spraying, hot-dip coating or the like.

What is claimed is:

1. A fishing reel component formed of a die-cast material comprising:
    a body member having a coating layer formed of higher-purity aluminum than that of the die-cast material on the die-cast material, and an anticorrosion layer formed by anodization on the coating layer;
    a support portion provided on the body member that rotatably supports a drive member,
    wherein the support portion independent from the body member is formed by a support member having a higher corrosion resistance than the die-cast material of the body member.

2. The fishing reel component according to claim 1, wherein the support member has an inner peripheral surface to which a bearing rotatably supporting the drive member is fitted, and fixed to a fitting portion of the body member.

3. The fishing reel component according claim 2, wherein the support member is fitted and fixed to a machined fitting portion of the body member.

4. The fishing reel component according to claim 2, wherein the inner peripheral surface to which the bearing of the support member is fitted is machined with the support member being fixed to the main body.

5. The fishing reel component according to claim 1, wherein the drive member includes a handle shaft, a spool shaft and a pinion shaft of the fishing reel.

6. A method of manufacturing a fishing reel component including:
    a molding step of melting, pouring into a mold, and casting under high pressure, a die-cast material to mold a body member of a desired shape;
    a coating layer formation step of forming a coating layer of higher-purity aluminum than that of the die-cast material on a surface of the body member;
    an anticorrosion layer formation step of forming an anticorrosion layer by anodization on the coating layer; and
    a fixing step of fixing to the body member a support member that rotatably supports a drive member and has a higher corrosion resistance than the die-cast material of the body member.

7. The manufacturing method according to claim 6, wherein a precision finishing portion of the body member is machined following the anticorrosion layer formation step, and the support member is fixed to the machined portion in the fixing step.

* * * * *